US005822428A

United States Patent [19]

Gardner

[11] Patent Number: 5,822,428

[45] Date of Patent: Oct. 13, 1998

[54] DATA ENCRYPTION FOR PRODUCT INFORMATION AND ACCESS

[75] Inventor: Gary Allen Gardner, Dallas, Tex.

[73] Assignee: Great Notions Corp., Dallas, Tex.

[21] Appl. No.: 813,679

[22] Filed: Mar. 7, 1997

[51] Int. Cl.[6] ................................ H04L 9/00; H04K 1/00

[52] U.S. Cl. .................................. 380/4; 380/21; 380/23; 380/25

[58] Field of Search .................................... 380/4, 21, 23, 380/25

[56] References Cited

U.S. PATENT DOCUMENTS

| | | | |
|---|---|---|---|
| 5,343,401 | 8/1994 | Goldberg et al. | 364/470 |
| 5,430,658 | 7/1995 | Divinsky et al. | 364/470 |
| 5,506,784 | 4/1996 | Tsonis et al. | 364/470 |
| 5,509,070 | 4/1996 | Schull | 380/4 |
| 5,510,994 | 4/1996 | Tsonis et al. | 364/470 |
| 5,541,847 | 7/1996 | Tsonis et al. | 364/470.09 |
| 5,646,992 | 7/1997 | Subler et al. . | |
| 5,668,730 | 9/1997 | Tsonis et al. | 364/470.09 |

*Primary Examiner*—Thomas H. Tarcza
*Assistant Examiner*—Hrayr A. Sayadian

[57] ABSTRACT

A method and a computer-readable media product are provided to enable controlled access to an embroidery design. The product includes a computer-readable storage medium, on which encrypted data defining the embroidery design is stored. Design specification data on the embroidery design is also stored on the computer-readable storage medium in the clear, i.e., unencrypted form. The design specification data includes information on stitch count, size, and a number of colors embodied in the embroidery design. A user can freely access the design specification data to determine whether to purchase a password to unlock the embroidery design. If so, the user purchases the password, which enables decryption of the encrypted embroidery design into a clear graphic format.

13 Claims, 5 Drawing Sheets

DATA ENCRYPTION FOR PRODUCT INFORMATION AND ACCESS

TECHNICAL FIELD

The present invention relates generally to an encryption of design information on CD-ROM and, in particular, to the encryption of designs for storage therewith.

BACKGROUND OF THE INVENTION

The use of a paper catalog has been a traditional sales tool for displaying products and other information of retailers and distributors. Such catalogs present a number of cost issues to the senders, such as printing costs, distribution costs, storage of the catalogs, etc. As technology has improved in the computer industry and as video cards have become able to display a greater variety of colors and shades, greater interest has been exhibited in using computers to display market wares, especially those that are color-dependent. Either through network access or through mailed out floppy disks, companies have begun to explore the usage of the computer as a marketing tool.

For industries where the advertisement and the product can be simultaneously transported on a floppy disk or CD-ROM, it will be advantageous to save costs by sending both on the same storage medium. A protocol is needed in the marketplace so that the product can be accessed from a storage medium after but not before a purchase is made. Such a protocol can also be implemented on a network system for downloading a product.

SUMMARY OF THE INVENTION

The primary object of the invention is to provide a copy protection scheme such that relevant access to the product design or specifications, i.e. an advertisement, can be achieved without procurement of the product itself.

These "advertisements" can be located on a computer storage medium, preferably a CD-ROM, or can be an option on a Web page accessible through a network. After viewing the advertisements, a customer can immediately choose the purchase the products. Located on the display screen is an "order" button which together with a password obtained after ordering the product from the supplier will allow the customer access to the product for usage.

In a preferred embodiment, embroidery designs will be stored on a CD-ROM. The user of the CD-ROM may access the image of the embroidery designs, may make color amendments to the design and view additional specifications. The data for the commercial implementation of each embroidery design is encrypted onto the CD-ROM. Therefore, in order to obtain selected designs, a user can call the supplier to obtain a password in conjunction with other coding from the CD-ROM to de-encrypt selected designs.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
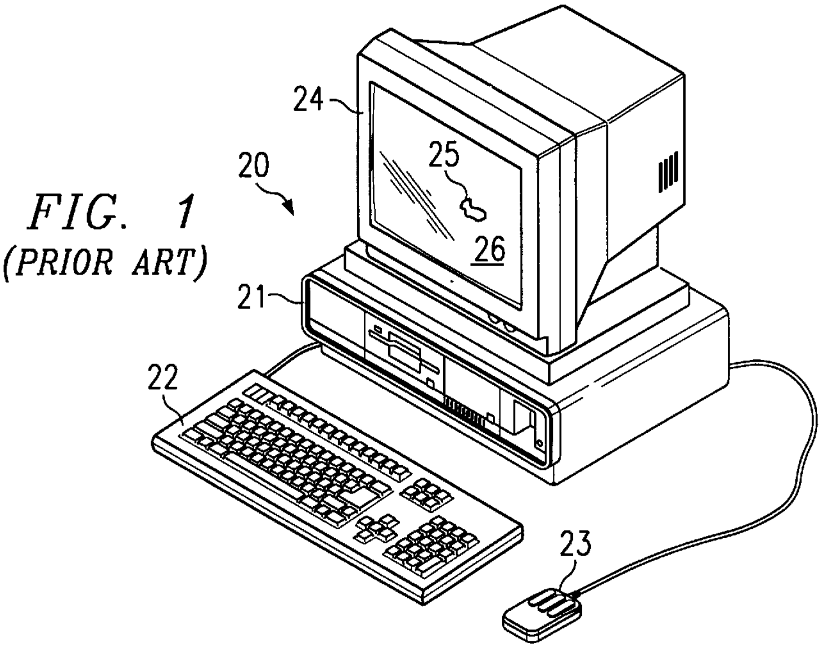
FIG. 1 (PRIOR ART)
FIG. 1 is an illustration of the computer system.

The CD-ROM is accessed on a personal computer system as illustrated in FIG. 1. A representative computer workstation is shown in FIG. 1. A computer 20, comprising a system unit 21, a keyboard 22, a mouse 23 and a display 24, is depicted in FIG. 1. The screen 26 of display device 24 is used to present the graphical user interface (GUI). The graphical user interface supported by the operating system allows the user to use a point and shoot method of input, i.e., by moving the mouse pointer 25 to an icon representing a data object, for example a design square, at a particular location on the screen 26 and pressing on the mouse buttons to perform a user command or selection.

Figure 2:
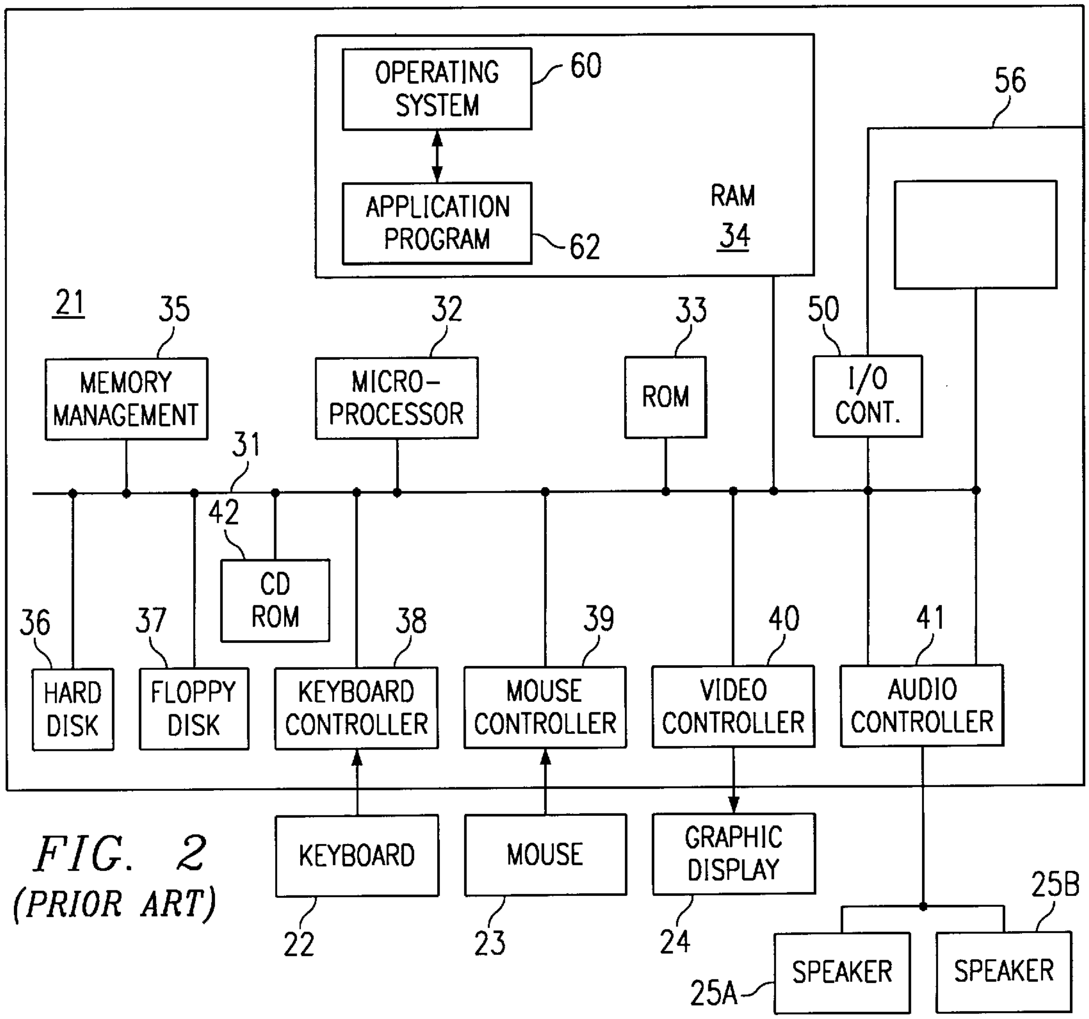
FIG. 2 (PRIOR ART)
FIG. 2 is a block diagram of a computer system in FIG. 1.

FIG. 2 shows a block diagram of the components of the personal computer shown in FIG. 1. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in today's personal computers can contain one of the Intel family of microprocessors including the Pentium® microprocessors. However, as noted above, other microprocessors include, but are not limited to, Motorola's family of microprocessors such as the 68000, 68020 or the 68030 microprocessors and various RISC microprocessors manufactured by IBM, Hewlett Packard, Sun, Intel, Motorola and others may be used in the specific computer.

The ROM 33 contains among other code the Basic Input-Output System (BIOS) which controls basic hardware operations such as the interaction and the disk drives and the keyboard. The RAM 34 is the main memory into which the operating system 60 and application programs 62 are loaded. The memory management chip 35 is connected to the system bus 31 and controls direct memory access operations including, passing data between the RAM 34 and hard disk drive 36 and floppy disk drive 37. The CD-ROM 42, also coupled to the system bus 31, is used to store a large amount of data, e.g., a multimedia program or large database. In the preferred embodiment, it will be use to access the product and advertisement.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers **25*a*** and 25*b*. There is an optional I/O controller 50 for interfacing with additional components 56, such as a modem.

Figure 3:
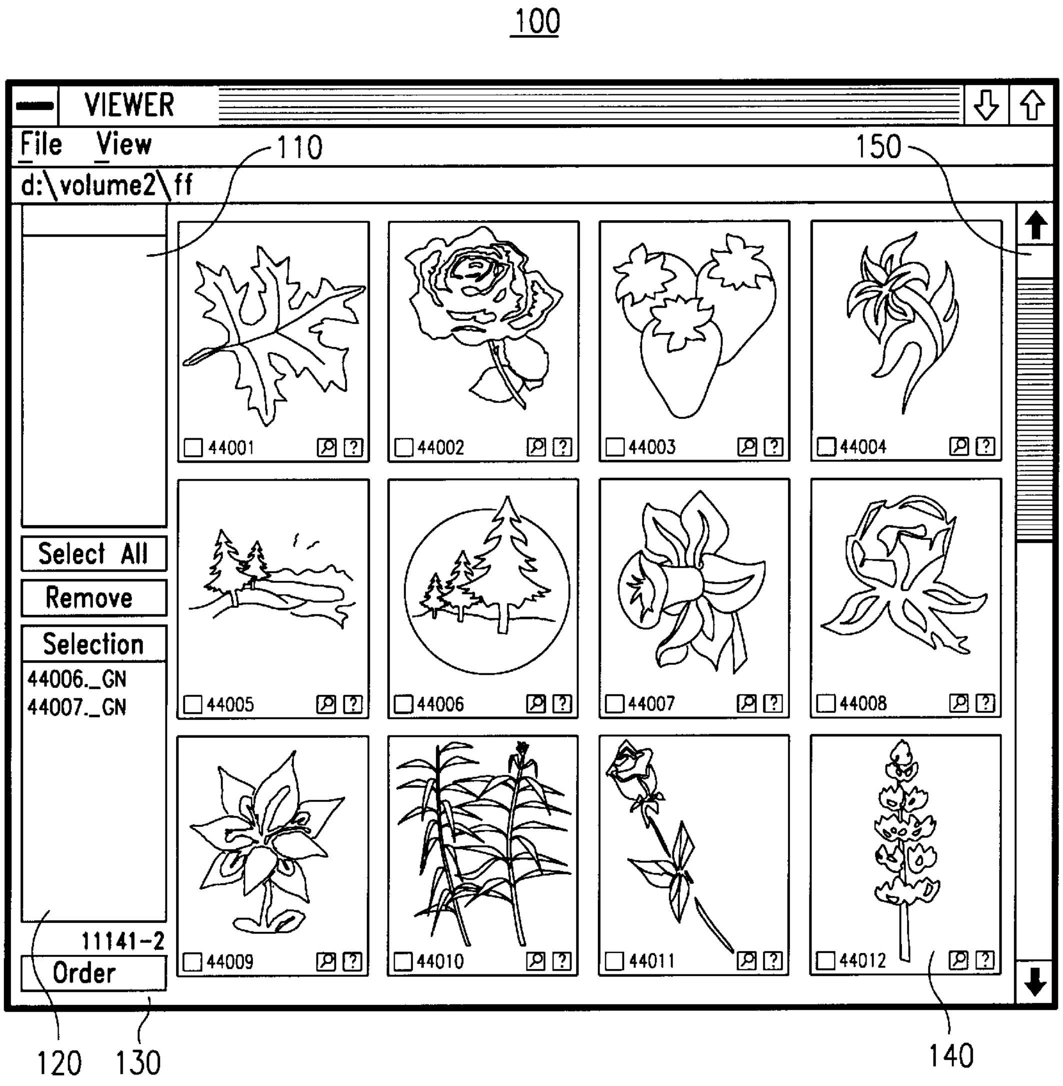
FIG. 3 is a sample main screen.

In its preferred embodiment, the CD-ROM will operate on a Windows 3.1x or later operating system, including Windows '95. As seen in FIG. 3, the program will display a main screen 100 which indicates the various product lines on the CD-ROM. A directories box 110 is located on the upper left hand side so that a customer can choose a directory. Beneath the directories box is a selection box 120 which keeps track of the products selected. There is an order option 130 beneath the selection box for commencing the ordering process. The products are displayed in Design Squares 140 and when appropriate, the user can scroll through the product listing using a scroll bar 150.

In this particular embodiment, the product line consists of visual designs that are used for embroidery. The designs are organized into a number of directories, such as sports, military, flowers, etc., for ease of access. Once a directory is selected by a user, the designs within that directory can be accessed. Initially, the designs are presented in sets of design squares with a lower degree of resolution for viewing. The customer may then select the box of the design square to obtain more information. The significance of combining the product line with an advertising means can be seen from the preferred embodiment. Ideally, over 11,000 embroidery designs can be incorporated onto a single CD-ROM. Representative catalogs incorporating the relevant information but without the flexibility of color alterations would take over 500 catalog pages. The cost benefits of such a combination is very high.

Figure 4:
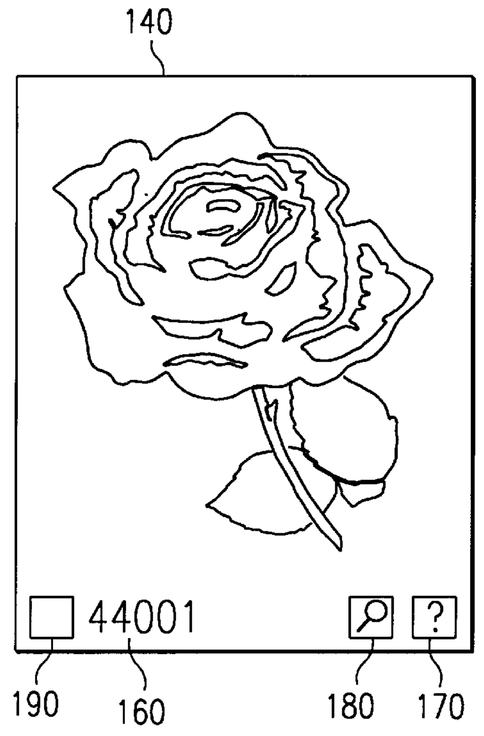
FIG. 4 is a sample close-up of a Design Square on a main screen.

As seen in FIG. 4, a Design Square 140 preferably has a number of features associated with it. Each Design Square preferably has a design number 160 associated with the square. There is also preferably a design parameter option 170 so that information may be obtained on the design. There is a Stitch Screen option 180 which allows the user to move to an enlarged sewout format of the design. Finally there is a select option 190 to add the particular design to the Selection Box.

Specific designs can also be obtained through a search function. The search function will request a segment of the design number. The program will then review all the directories to extract the Design Square associated with the design number.

Figure 5:
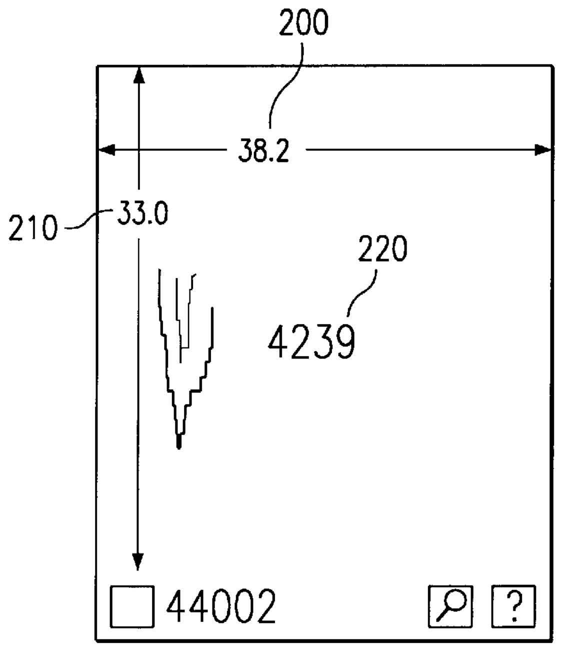
FIG. 5 is a sample of the design parameter display.

Referring to FIG. 5, when the Design Parameter option is selected, the width 200 and height 210 of the design can be viewed. The stitch count 220 of the design can also be displayed.

Figure 6:
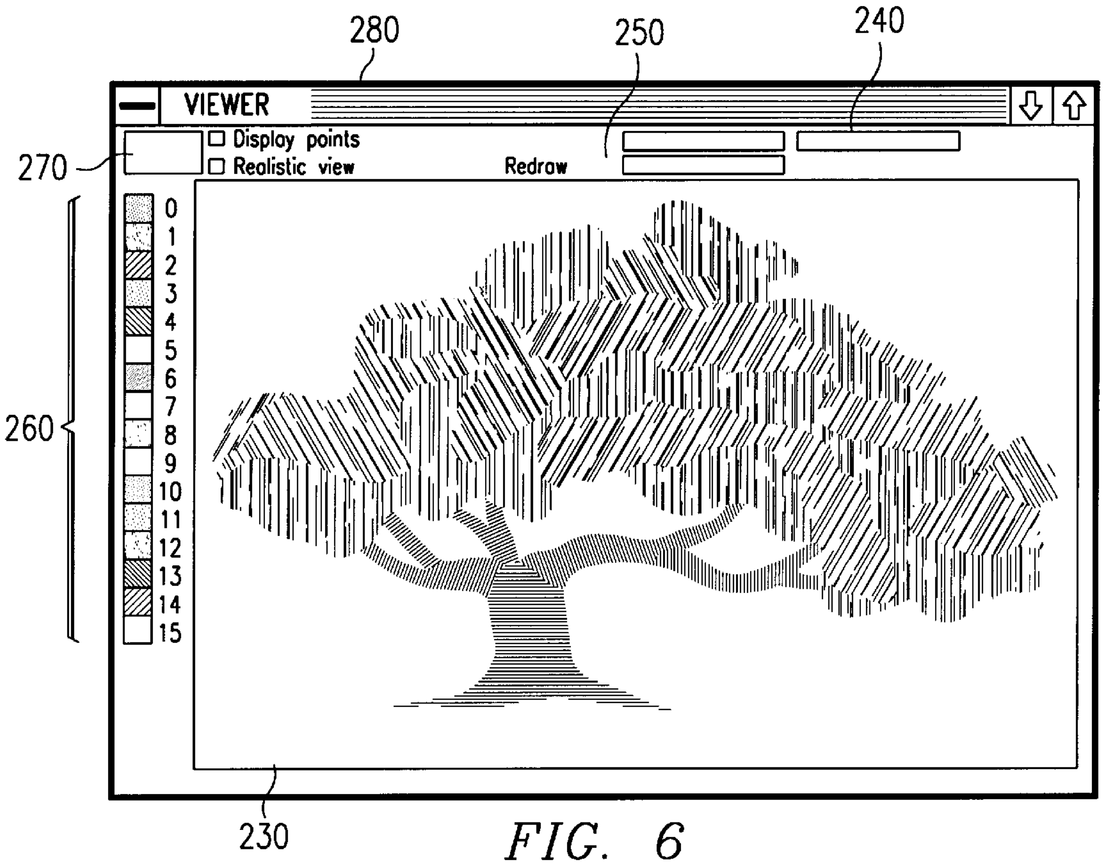
FIG. 6 is a sample Stitch Screen.
Figure 7:
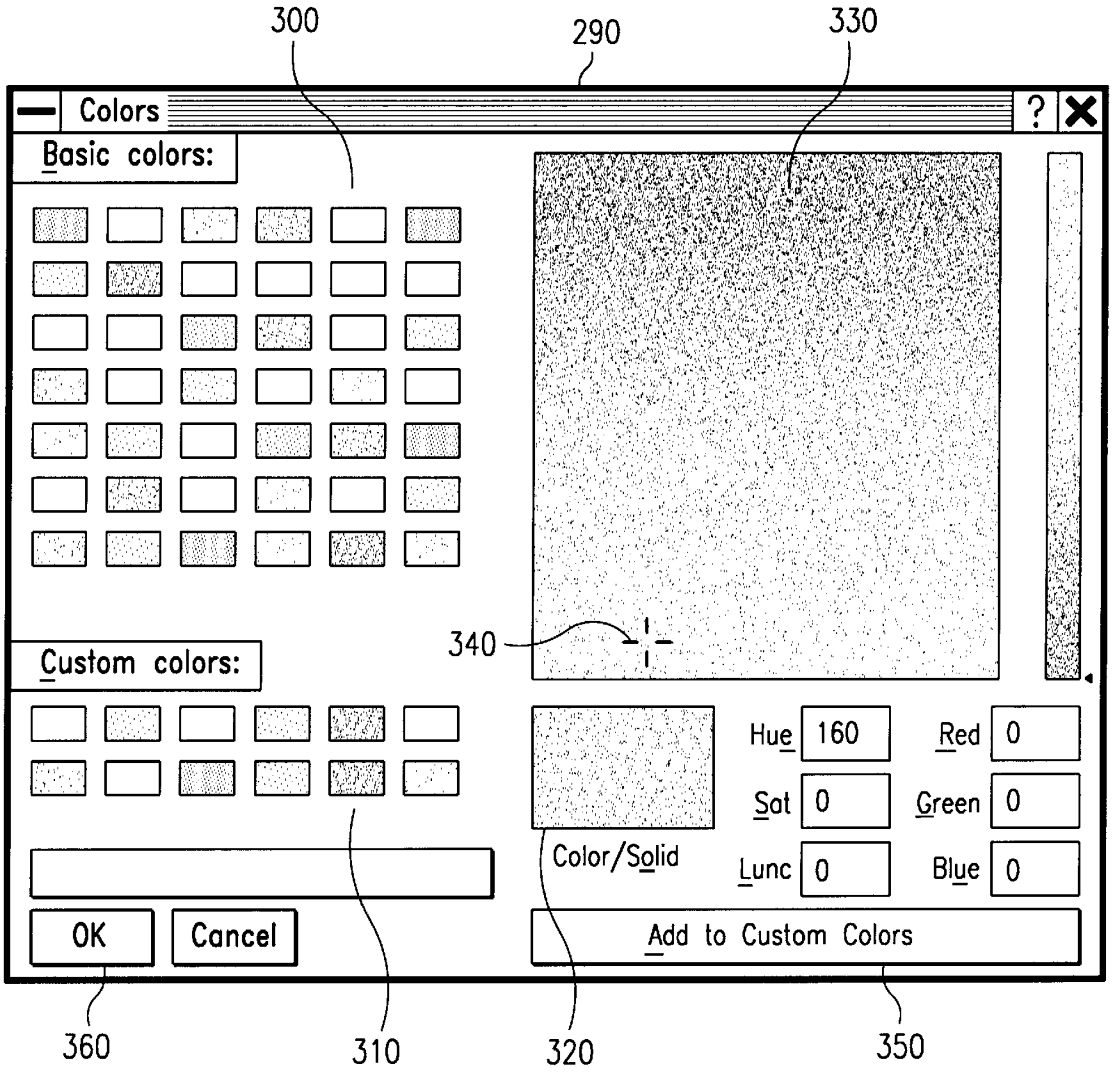
FIG. 7 is a sample screen showing the Color Palette Screen.

Referring to FIG. 6, after selecting the Stitch Screen option 170, a Stitch Screen window 230 appears. This screen also incorporates the data 240 from the Design Parameter screen. The screen shows the image as it would appear stitched. There is a color palette on the side 260 so that the customer can experiment with the look of a number of color combinations. The design can also be viewed in a display point format, which shows the stitching line patterns, or it can be viewed in the realistic format which is the solid shading look. The redraw button 250 must also be clicked upon after a change in viewpoint in order for the system to present the selected viewpoint. There is a "return to main menu" option 270 after viewing In order to change color, the color palette may be selected. As seen in FIG. 7, the Color Screen 290 can have a set of basic colors 300 on the upper left hand side and a selection of custom colors 310 beneath. The custom colors refer to the colors that are presently used in the design. To change a color in the design, the user can select the custom color which will then appear in the color/solid box 320. To change that particular color, the user may select from the basic color chart 300 or use the palette square 330. The palette square 330 presents the range of primary and secondary colors with the range of hues in between. The user can guide a bulls-eye marker 340, preferably with a mouse, to a section of the palette and select a section of the palette square. That color will then appear in the color/solid box 320. When the proper replacement color is selected, the user can select the "Add to Custom Color" option 350 which will then change the color in the Custom Color chart 310. After all the contemplated changes have been made, the user selects the OK button 360 which returns the user to the Stitch Screen 230. Then the user selects the Redraw option 250 to implement the color changes.

Figure 8:
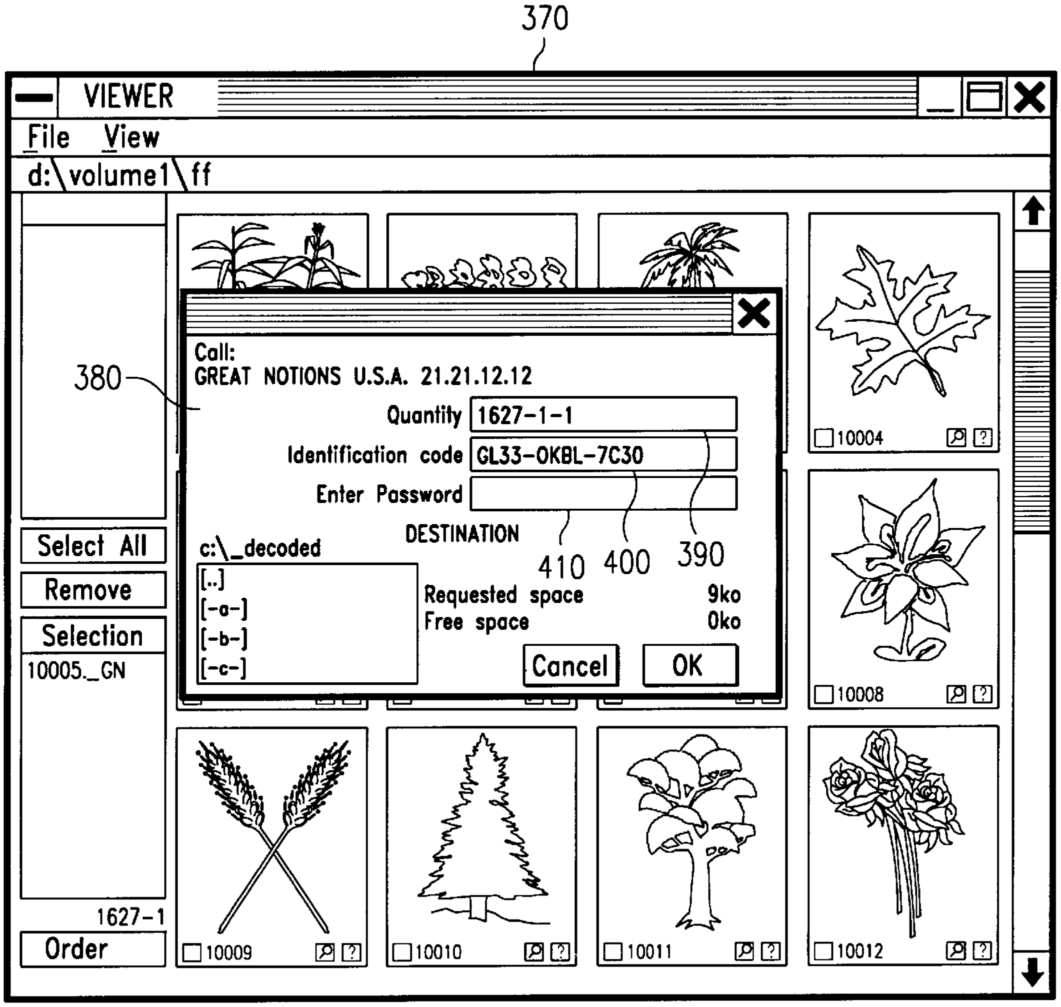
FIG. 8 is a sample Order Screen.

After experimenting with the various designs and color schemes, the customer may order any selected designs. Referring back to FIG. 3, the ordering process begins with selecting the order option 130 underneath the selection box. The selection of the order option will bring up a screen 370 such as the one in FIG. 8. The screen will contain the supplier phone number 380 to be called during the ordering process. Two protective code elements, the quantity code 390 and the identification code 400, will appear that are derived from the program on the CD-ROM. In a preferred embodiment, the quantity code will pass the information on which selections have been chosen. After calling the supplier and purchasing the design patterns over the phone, a password will be provided from the supplier to the user. The user will then input the password 410. The password in conjunction with the identification code in the CD-ROM will cause a window to appear on the display screen noting that the selected embroidery designs may be written onto a hard drive or a floppy disk.

In its preferred embodiment, the password generated will form a_DECODED directory on the computer hard drive which will indicate which designs have been purchased on the CD-ROM.

An alternative embodiment is purchasing the product on a Web site. Similar to the CD-ROM usage, the customer will be able to view the embroidery designs at the Web site and make modifications and selections. By dialing a number and obtaining the password, the Web site will de-encrypt the stored embroidery data file for the customer to download.

Although the invention has been described in terms of a preferred embodiment for the accessing and purchasing of embroidery designs, those skilled in the art will recognize that the invention can be practiced, with modification, for other computer storage dependent products and for computer network products with the spirit and scope of the appended claims. The alternative embodiments of the products can range from other form of data files, such as digitized photos, to software programs. The advertising means can include software demos or product specifications.

Having thus described our invention, what we claim as new and desire to secure by Letters Patent is set forth in the following claims.

I claim:

1. A method for controlling access to an embroidery design, comprising the steps of:

(a) encrypting the embroidery design to generate an encrypted embroidery design;

(b) providing a user with the encrypted embroidery design together with design specification information, the design specification information being unencrypted and including information on stitch count, size, and a number of colors embodied in the embroidery design;

(c) having the user evaluate at least some of the design specification information; and (d) selectively providing the user with a password to enable decryption of the encrypted embroidery design upon request by the user.

2. The method of claim 1, wherein step (b) comprises storing said encrypted embroidery design and said design specification information on a computer-readable storage medium, and providing said computer-readable storage medium to said user.

3. The method of claim 2, wherein said computer-readable storage medium is a CD-ROM.

4. The method of claim 1, wherein step (b) comprises downloading said encrypted design and said design specification information to the user over a computer network.

5. The method of claim 1, wherein step (d) includes providing the user with the password upon receipt of a payment authorization.

6. A computer-readable media product enabling controlled access to an embroidery design, comprising a computer-readable storage medium on which are stored an encrypted version of the embroidery design and an unencrypted version of design specification data, the design specification data including information on stitch count, size, and a number of colors embodied in the embroidery design.

7. The computer-readable media product of claim 6, wherein said computer-readable storage medium is a CD-ROM.

8. The computer-readable media product of claim 6, further including means enabling the user to customize colors of said embroidery design.

9. The computer-readable media product of claim 6, wherein said information on size includes height and width dimensions of the embroidery design.

10. A method of accessing an encrypted embroidery design stored in a computer readable-storage medium, said storage medium also including unencrypted design specification information on the embroidery design to enable a user to make an informed decision about purchasing the embroidery design, said method comprising the steps of:

(a) retrieving the design specification information from the storage medium, the design specification information including information on stitch count, size, and a number of colors embodied in the embroidery design;

(b) selectively displaying on a computer at least some of the design specification information;

(c) examining at least some of the design specification information and determining whether the user desires to purchase the embroidery design;

(d) if the user desires to purchase the embroidery design, providing the user a password to enable decryption of the encrypted embroidery design into a clear graphic format.

11. The method of claim 10, wherein said computer-readable storage medium is a CD-ROM.

12. The method of claim 10, wherein step (d) includes purchasing the password.

13. The method of claim 10, further comprising the step of customizing colors of said embroidery design after step (b).

* * * * *